Dec. 21, 1954   O. J. OLSON   2,697,535
OUTLET BOX

Filed June 25, 1951   3 Sheets-Sheet 1

INVENTOR.
OSCAR J. OLSON
BY Reynolds, Beach & Christensen
ATTORNEYS

Dec. 21, 1954  O. J. OLSON  2,697,535
OUTLET BOX
Filed June 25, 1951  3 Sheets-Sheet 2

INVENTOR.
OSCAR J. OLSON
BY
Reynolds, Beach & Christensen
ATTORNEYS

Dec. 21, 1954    O. J. OLSON    2,697,535
OUTLET BOX

Filed June 25, 1951    3 Sheets-Sheet 3

INVENTOR.
OSCAR J. OLSON
BY
Reynolds, Beach & Christensen
ATTORNEYS

United States Patent Office 2,697,535
Patented Dec. 21, 1954

2,697,535

OUTLET BOX

Oscar J. Olson, Seattle, Wash.

Application June 25, 1951, Serial No. 233,426

16 Claims. (Cl. 220—3.2)

Outlet boxes for connection to lighting fixtures, or for the support of switches, sockets, or like electrical elements, are liberally used in modern construction, and the wires are led to and from them through tubular metallic conduits connected at their ends to such outlet boxes, entering at knockout holes. The standard octagonal outlet box, with which this invention will prove most useful, but to which it is not necessarily confined, comes in various sizes; the three-inch depth is widely used. It is just under four inches across, and has eight knockouts—one in each side wall—located each with its center 7/8" from the outer end of the box. The knockouts in every other side wall are 1 1/8" in diameter, and the knockouts in the intervening side walls are 7/8" in diameter, the purpose being to accommodate large or small conduit connectors, interchangeably in or near each of four sides around the box. There is but 5/16" between the peripheral margin of the large-size knockout and the outer end of the box, to accommodate plaster, and slightly more in the case of the small-size knockouts, which is adequate, and it is desirable to locate the knockouts near the outer end of the installed box, which end is flush with the plaster, for it facilitates subsequent pulling of wires through the conduits, and connection of the wires to the fixture located at the outlet box.

Suspended ceilings, in appropriate structures, are supported from a grid of light, parallel channels or similar structural elements, at rather close intervals, supported in turn by heavier transverse channels at somewhat wider intervals, beneath which and to which the lighter channels are wire-tied. The metal lath is tied to the smaller channels at frequent intervals, and the larger channels are suspended by wires from the ceiling or like solid support above. Wall structure is similar to this ceiling structure. This structure in itself creates a maze through which the electrical conduits must thread their way, often at an angle to both the larger and the smaller channels. Should it happen that such a conduit runs parallel to the smaller channels, or in a vertical wall parallel to studding, the connection of its end to the box at the predetermined level or depth of the knockout is a simple matter, for the conduit can ordinarily lie close behind the metal lath. More usually the conduit will cross the smaller channels, or the studding, at some angle, and is thereby displaced inwardly at least by the depth of these channels, perhaps 1/2" or 3/4". If the outlet box, and the knockout therein to which the conduit leads most directly, happens to lie close to a channel or stud, as often it does in spite of most careful planning, it is a difficult and time-consuming job to bend the conduit's end outwardly after it has cleared the obstructing element, and then reversely laterally at the proper depth, to lead fairly and straight into the arbitrarily located knockout near the outer end of the box. If, instead of being displaced by only the depth of a shallow channel, a heavier channel, or a duct, or a plumbing line happens to lie in the way, and requires greater displacement, the difficulty is compounded. Often the only solution has been to gooseneck the conduit end, and to lead it into a knockout in the inner end wall of the box, which is undesirable. One other expedient is to increase the depth of the outlet box, and hence displace inwardly the location of the knockout, by the addition of an extension to the outer end of the box. This is costly, renders more difficult the pulling of the wire and its connection to the fixture, and adds to the total depth necessary behind the finish wall, which sometimes is a critical dimension.

The present invention presents a solution to such problems which consists in providing, in each side wall of the box, or at the least in every two adjacent or adjoining side walls, a plurality of knockouts, arranged in such patterns that from among them may be chosen, at will, that size knockout required for each conduit, at that depth inwardly from the box's outer end which will most nearly coincide with the natural location of the conduit's end, and require the minimum of bending in the latter, and if any, merely lateral bending without a reverse bend, and all this regardless of the direction from whence each conduit extends.

In my copending application, Case A, Serial No. 141,241, filed January 30, 1950, now Patent No. 2,663,454, issued December 22, 1953, I have proposed one solution to this problem, which consists in essence of locating a plurality of knockouts in certain side walls at half-diameter spacings, so that successive knockouts overlap, and thus make possible the selection of some one knockout at the desired spacing from the outer end of the box. A careless workman might easily knock out areas outside the particular area he intends to knock out, leaving an opening in the wall of the outlet box, which of course is always undesirable and, under some building codes, unacceptable.

In the present invention it is the general object to provide, in two adjacent, usually adjoining, side walls of the box, knockouts spaced by as small intervals lengthwise of the box—such as intervals of half-diameters— as could be provided by overlapping the knockouts in a single side wall, and sufficient numbers of such knockouts in the length of each such side, as will readily accommodate the conduit ends at widely varying depths, with a minimum of bending in order to lead fairly into the box. Whereas some lateral bending may be required to lead a conduit to a knockout at just the correct depth in one or the other of two adjoining or nearby angularly disposed side walls, wherein the corresponding knockouts are relatively displaced longitudinally, thus is readily accomplished, as compared to the job of bending the conduit sharply outwardly over an obstruction, and then sharply and reversely laterally to lead fairly into a single knockout at a minimum depth, as in connecting to presently used standard boxes. Since the half-diameter (or similar) spacing is as between knockouts in two separate side walls, the danger of knocking out excess areas is practically eliminated, yet the flexibility of choice as to depth of the knockouts is preserved.

It is also desirable to provide each outlet box with knockouts of two different sizes, for connection of either 7/8" or 1 1/8" conduits, and to locate these two sizes of knockouts in as many of the sides—at least four, in the standard octagonal box—and at such varying depths, as will facilitate the connection of either size of conduit from any direction at any desired depth, or the connection of conduits of both sizes thus, from whatever direction each happens to lead, and at whatever depth each happens to lie, with a minimum of bending, and that if needed primarily laterally, in a single bend rather than a reverse bend.

More specifically, in the present invention it is the object in general to provide an outlet box with knockouts in a given side wall and in one, two or three paired side walls, a series of such knockouts in each such side wall located in a definite geometrical pattern, and with their centers at given distances from the outer end of the box, and to provide in a different side wall, and likewise in a second, third, and perhaps a fourth side wall, paired with this different side wall, a second series of knockouts, likewise located in a similar geometrical pattern, and having their centers displaced, respectively, to lie at different distances from the outer end wall of the box than the centers of the corresponding knockouts in the first group of side walls. By the expedient just explained in general terms, and which will be explained in greater detail hereinafter, it is possible to choose a knockout in any given side wall which approaches closely to the level of the conduit for connection thereto, and so without any appreciable bending or displacement of a conduit, to connect it directly to the outlet box while the latter is disposed in its proper relationship to the surface of the finished wall. In so doing, the time required, and consequently the cost of installing such knockout boxes, is greatly lessened, and the pulling of wire is facilitated, with further saving in time and expense.

It is a further object of this invention to incorporate the principles just explained in outlet boxes of various geometrical patterns for the knockouts, and in various arrangements of knockouts relative to one another, particularly of the knockouts of different size in different groups in the same side wall or walls.

The invention will be better understood after the principles thereof and the various different embodiments of that principle as illustrated in the several views of the drawings are explained hereafter in detail.

In the accompanying drawings the invention, in its general principles and in various specific applications, is illustrated in different views.

Figure 1:
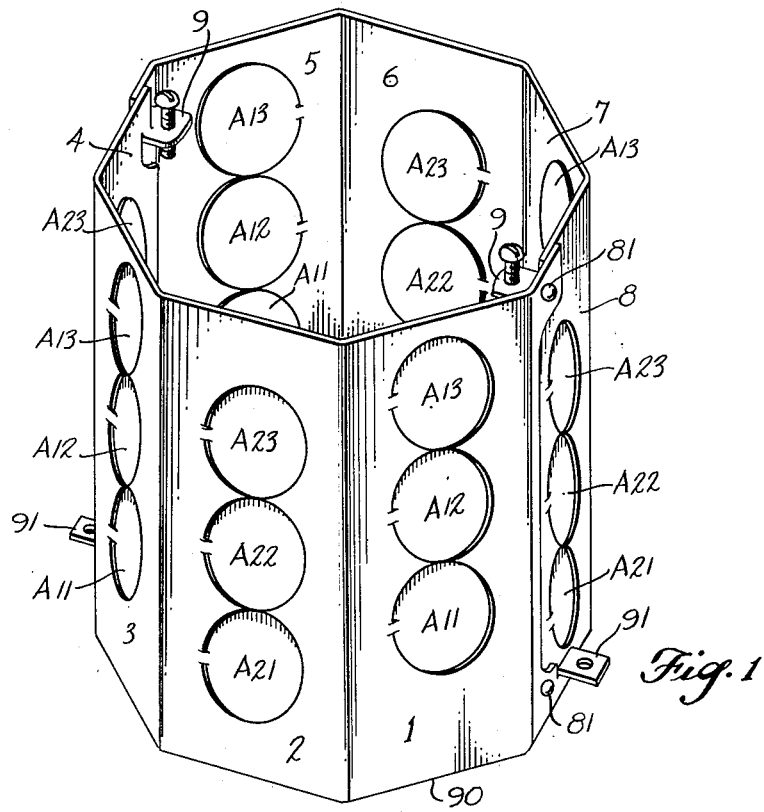
Figure 1 is an isometric view of an illustrative form of the box.

The invention may be incorporated in an outlet box having an even number of sides, such as six-sided or four-sided boxes of known type, but preferably is incorporated in the standard box of eight sides. Such a box is shown in Figure 1, and in order to distinguish the several sides they are designated, in order around the box, 1, 2, 3, 4, 5, 6, 7, and 8. It will be understood that the means for securing the sides 1 and 8 to retain the box in the form of a complete enclosure, such as the securing means shown at 81, are or may be conventional in nature, as are the end retaining means at 9, and the mounting means at 91. The inner cover or cap 95 is likewise conventional.

Figure 2:
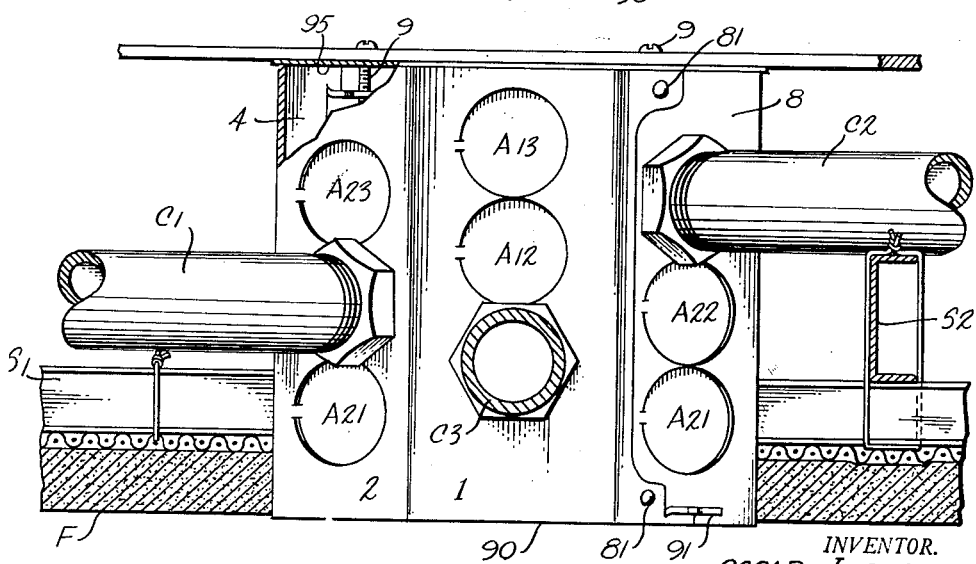
Figure 2 is an elevational view, partly in section, of this form of the box in actual use, the wall, in this case a ceiling, being shown in section.

Considering first the form shown in Figures 1 and 2, wherein the principles of this invention are illustrated in a simple and practicable arrangement, in the side wall 1 are formed a series of knockouts A11, A12, and A13. The knockout A11 has its center at a definite distance from the open end 90 of the box, and by reason of the fact that the other knockouts are arranged in a definite geometrical pattern, in this instance in longitudinal alignment and tangently touching one another, their centers too are located at definite distances from the end 90. Coming to the side wall 2, however, here the knockouts A21, A22 and A23 are located in the same geometrical pattern as the series A11, A12 and A13, but the center of the first knockout A21, and consequently the centers of all the other knockouts in the second series, that in the wall 2, are displaced longitudinally with relation to the centers of the corresponding knockouts in the first series A11, A12 and A13. In the particular form illustrated the displacement is by one-half the diameter of the knockouts, and since all the knockouts in the two series are of the same size, this locates the centers of the knockouts A22 and A23 generally at the same level as the point of tangency between the knockouts A11 and A12, and A12 and A13, respectively. Thus there is a choice, at half-diameter spacings, in one or the other of the adjoining walls 1 or 2, of the level at which to connect a conduit.

In similar fashion, in the third side wall 3, the knockouts are of the same size, arranged in the same pattern, and at the same spacing from the end 90 as the knockouts in the first series, those in the side wall 1, and so they are designated by the same reference characters, A11, A12, and A13. The side walls 1 and 3 are, then, paired one with another. Proceeding around, the side wall 4 has its knockouts arranged in the same pattern and at the same spacing as the knockouts in the second series, those in the side wall 2, so these two side walls 2 and 4 are paired. Continuing on around, the side wall 5 has its knockouts paired again with those in the side wall 1, the side wall 6 has its knockouts paired with those in the side wall 2, the side wall 7 has its knockouts paired with those in the side wall 1, and the side wall 8 has its knockouts paired with those in the side wall 2. In this particular arrangement the knockouts, all of a given size, are displaced longitudinally in each side wall relative to the knockouts in the two adjoining side walls. Each first side wall is paired with three other side walls, and each second side wall is likewise paired with three other but different side walls.

By this expedient a conduit C1, which is at a level from the finish face of the finish wall at F by a distance sufficient only to avoid shallow channel S1, may connect to the hole left by the knockout A22 in the side wall 2, whereas a conduit C2, which must be at a sufficient depth to avoid a deeper channel S2, may lead directly into the hole left by the knockout A23 in the side wall 8, and a conduit C3, running parallel to the channels S2, may lead into the hole left by the knockout A11 in the side wall 1. A conduit extending parallel to the channels S1 might be connected at A21, at the very minimum depth. Similarly, at opposite or paired sides, it is generally possible to find a knockout in any given side wall at a proper distance inward from the end 90, and thereby to avoid the necessity of reversely bending the conduit for purposes of connection.

Figure 3:
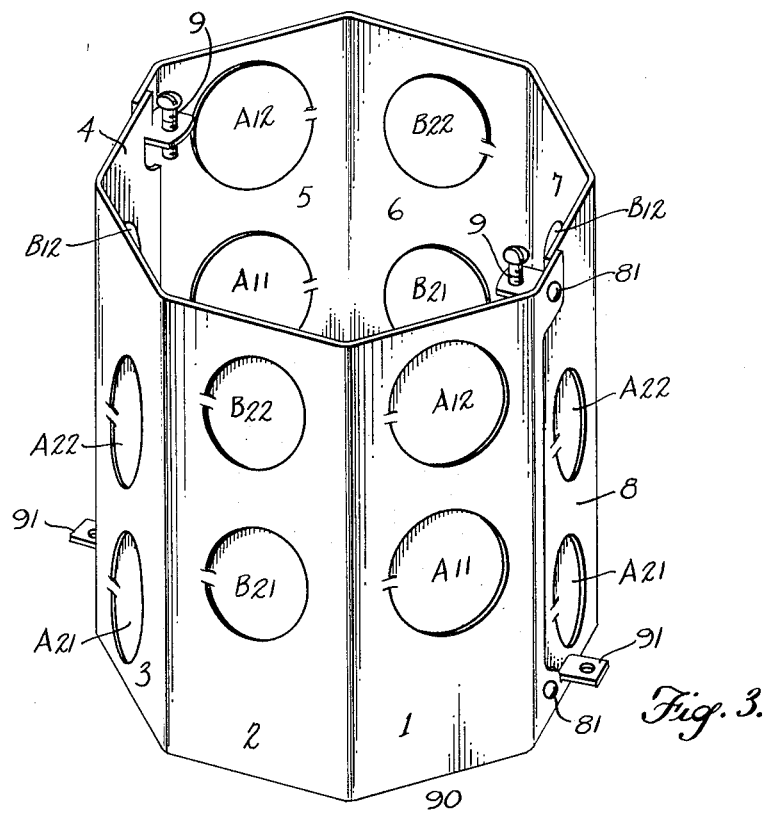
Figure 3 is an isometric view similar to Figure 1, showing a modified form of the box.

In distinction to the arrangement of Figures 1 and 2, the knockouts in Figure 3 are not all of the same size. The knockouts A11 and A12 in the side wall 1 are generally similar to the corresponding knockouts in the form shown in Figure 1, but are more widely spaced apart, and are differently spaced from the end 90. In the side wall 2, however, the knockouts B21 and B22 are of a smaller size than the knockouts A11 and A12, but again differing from the arrangement of Figure 1, the knockouts A11 and B21 are at the same center spacing from the outer end 90 of the box. Going on around the box, the knockouts in the side wall 3 are at different center spacings from the end 90 than the corresponding knockouts A11 and A12, but are of the same size, hence are designated A21 and A22. Going on around to the side wall 4, the knockouts therein are of the same size as those in the paired side wall 2, but at different center spacings, and these are designated, the upper one, B12. Thus it will be seen that adjoining side walls in this particular arrangement have their knockouts at similar spacings from the end 90, but are of different size, and the alternate walls have their knockouts of the same size but at different center spacings. This affords an appreciable degree of flexibility, for by a simple lateral bend not exceeding 90° a conduit can be connected at any desired depth. Flexibility in connecting conduits of different sizes to one box is especially promoted by this arrangement.

Figure 4:
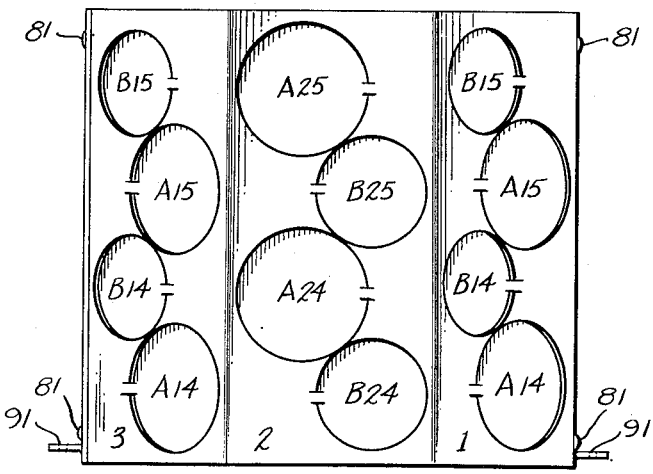
Figure 4 is a side elevational view, similar to Figure 2, but showing a further modified form, and omitting the connections and supports and the wall.

The arrangement shown in Figure 4 is a further way of enabling the connection of conduits of different size to the several side walls of a box, but at varying levels in the different side walls, in this case in one or the other of adjoining side walls. Here, beginning with the side 1, the larger knockouts A14 and A15 are arranged in longitudinal alignment with one another, but spaced apart, and offset toward one edge of the side wall. In the next side wall 2 similarly sized knockouts A24 and A25 are similarly aligned and offset laterally, and are also displaced longitudinally with respect to the knockouts A14 and A15. As we continue around the box, in the side wall 3 the knockouts A14 and A15 are duplicates of those in the side wall 1, so that the side walls 1 and 3 are paired, and if further sides were shown the next adjoining side would be paired with the wall 2, and so on around the box.

Reverting to the first side wall 1, there are knock-outs B14 and B15 which are aligned longitudinally with one another, but which are offset laterally to the opposite side of the side wall from the knockouts A14 and A15, so that they are interspersed therewith, and in order to get them all into a conventionally sized outlet box without overlapping it would be necessary to place them tangent to one another. In the side wall 2 the knockouts B24 and B25 are of the same size as the knockouts B14 and B15, but are similarly offset longitudinally, and laterally with respect to the knockouts A24 and A25, and so on around the box. The result is that in any given side, or in the adjoining side, a knockout can be found at half-intervals from those in the adjoining side, which will afford ready access for the connection of a conduit at any given level, and this too of either of two sizes of conduits. Such a box as this affords virtually the maximum of flexibility, as to size and as to depth of the several points of connection.

It has been pointed out above that the overlapping of knockouts may entail certain disadvantages, and it is preferred to locate the knockouts which are spaced at half-intervals, whether all of one size or of different sizes, in two different but adjacent—if not adjoining—side walls, and examples have been given above of various ways in which these ends can be attained. Nevertheless, it is also advantageous to provide two different sizes of knockouts in each side wall, and to locate them at minimum center spacings lengthwise between the several knockouts of each size in each side wall. Unless the size of the standard box, and hence the size of its side walls, is to be increased, or the diameter of the conduits is to be reduced, neither of which is practicable, there must be some overlapping of knockouts if these mutually conflicting ends are to be attained to the full extent sometimes desirable.

Figure 5:
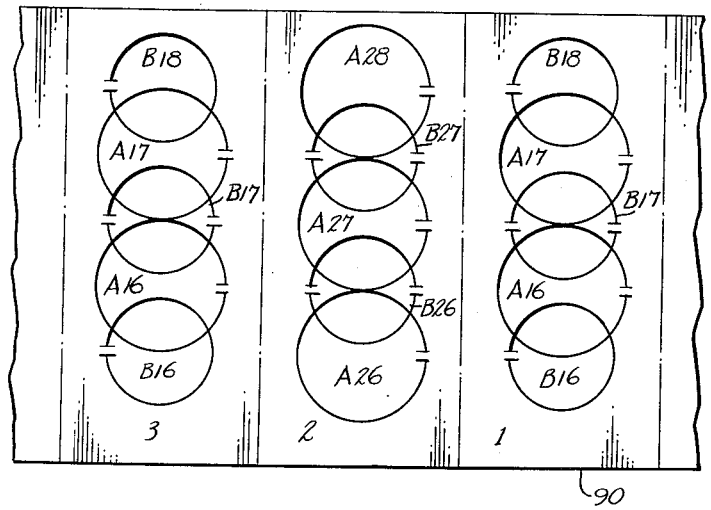
Figure 5 is a development in elevation of several sides of a further modified form of the box.

One manner of attaining these two ends is illustrated in Figure 5. Here in the side wall 1 the knockouts A16 and A17 are in alignment and at given center spacings from the outer end 90 of the box, and in the arrangement illustrated are placed tangent to one another, although the latter is not essential. Interspersed between them, and preferably centered at the points of tangency, are the smaller sized knockouts B16, B17 and B18. Coming to side wall 2, there are provided a similar number and arrangement of knockouts A26, A27 and A28, at different spacings than the corresponding knockouts A16 and A17 (wherefore three of this size rather than two can be provided), and the smaller knockouts B26 and B27 are interspersed therewith. The side wall 3 has its knockouts paired with those of the side wall 1, and so on around the box.

Figure 6:
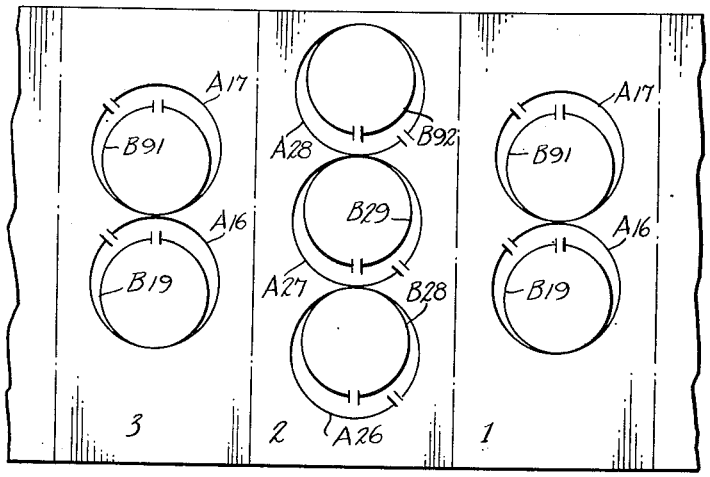
Figure 6 is a similar development showing a still further modification.

A similar but slightly changed arrangement is shown in Figure 6. Here in the side wall 1 are the knockouts A16 and A17, arranged in much the same fashion as in Figure 5, but the smaller knockouts B19 and B91 are arranged with their centers offset somewhat with respect to the centers of the corresponding larger knockouts A16 and A17, respectively, so that the smaller knockouts lie tangent at one point to and within the larger knockouts. Coming to the side wall 2, the knockouts A26, A27 and A28 are arranged as described before with reference to Figure 5, with their centers at different spacings from the end 90 than the knockouts A16 and A17, but here we have the smaller knockouts B28, B29 and B92 each eccentric to the corresponding larger knockout, and offset to a point of tangency therewith. In this manner the centers of the smaller knockouts B28, B29, and B92 are displaced by half-intervals, or approximately so, from the knockouts B19 and B29 of the same size in the adjoining side wall. So on around the box, the knockouts in the side 3 are paired with those in the side 1, and there would be another side paired with the knockouts in the side 2, etc.

The essence of the invention may be said to consist in the locating of a series of knockouts in each of several side walls in such pattern and longitudinal displacement that in one or another of two adjacent side walls, and usually in adjoining side walls, knockouts of a given size are located at spacings from one another which are less than the diameter of such knockouts, yet overlapping of knockouts of that particular size is avoided. Thereby whatever bending of the conduit end that may be required is lateral in nature, rather than a reverse bend outwardly and then laterally towards the box, and its extent is always slight, never more than 90° and usually much less. This principle is not violated when, as in Figures 5 and 6, overlapping or coincidence of knockouts occurs by reason of the inclusion of knockouts of different size in one side wall; in these latter instances the overlapping or coincidence is only as between knockouts of different size, and not as between knockouts of the same size. Indeed, as Figure 4 illustrates, it is possible to obtain the advantages of this invention in large measure, while still employing two different sizes of knockouts in each side wall, and at the same time to avoid overlapping. Likewise, Figure 3 illustrates how these same principles may be embodied without overlapping, with some compromise as to the extent of lateral bending of the conduit that may be necessary. All forms afford the advantage of practically eliminating sharp reverse bends in close quarters, in planes normal to the surface of the finish wall F.

The knockouts illustrated are of the type which have a single unbroken tongue to insure retention of the knockout until the workman purposely knocks it out. This conventional feature is not related to the present invention, and more such tongues for each knockout, or none at all, may be employed as the designer or manufacturer of the box prefers.

I claim as my invention:

1. An outlet box for connection of conduits at varying distances from the box's outer end, as necessary to avoid adjacent obstructions, said box being formed with a plurality of side walls defining an enclosure having an inner and an outer end, a plurality of knockouts of a single size to receive a given conduit connection, located in a first such side wall and arranged in a definite geometrical pattern, such that a first knockout has its center located a predetermined distance from the box's outer end, and the second and all succeeding knockouts have their centers spaced from the first and from each other, successively, by definite distances, and a similar number of knockouts of the same size located in a further such side wall adjacent the first, and arranged in a similar pattern, but displaced lengthwise of the box to locate the center of the first knockout at a different distance from the box's outer end, with the centers of the other knockouts in the further side wall similarly displaced relative to the centers of corresponding knockouts in the first side wall, additional side walls paired with said first and the further side walls, respectively, and each having knockouts corresponding in number, pattern, and spacing relative to the outer end of the box, to the knockouts of the side wall with which it is paired.

2. An outlet box as in claim 1, wherein the displacement of the centers of the knockouts in the further and its paired additional side wall or walls, relative to the centers of corresponding knockouts in the first and its paired side wall or walls, is approximately half the spacing between the centers of like knockouts in such first side wall.

3. An outlet box as in claim 1, wherein the box has an even number of side walls, and the first and its paired walls are located in general at opposite sides of the box, and the further and its paired walls are located intermediate the first and its paired wall.

4. An outlet box as in claim 1, wherein the knockouts in two adjoining walls are at like center spacings from the box's outer end, but are of different size, and the knockouts in two other side walls, paired with such two adjoining walls, respectively, are similarly of relatively different size, but are displaced longitudinally relative to the knockouts of the same size in the first two adjoining walls.

5. An outlet box as in claim 1, wherein all the knockouts in each side wall are of like size, and have their centers aligned longitudinally, and their margins substantially tangent, the centers of knockouts in the first wall being located generally at the longitudinal spacing from the box's open end of the points of tangency in the further wall from such open end.

6. An outlet box for connection of conduits at varying distances from the box's outer end, as necessary to avoid adjacent obstructions, said box being formed with eight side walls defining an enclosure having an inner and an outer end, a series of knockouts of a single size to receive a given conduit connection, located in a plurality of the several walls, arranged in a definite and like geometrical pattern in each such wall, the first such knockout in a given first wall having its center at a given distance from the enclosure's outer end, the second such knockout in the first wall having its center spaced lengthwise by a given distance from the center of the first knockout, the third and succeeding knockouts, if any, being similarly spaced in succession by the same distance, and the first knockout in an adjacent second wall having its center displaced by a different distance from said outer end, but all succeeding knockouts in the second wall having their centers spaced by the same distance from the first knockout and from one another as are the corresponding knockouts in the first wall, additional side walls generally opposite to the first wall having the centers of their knockouts located at substantially the same distances from the outer end and from one another as those in the first wall, and other additional side walls generally opposite the second wall having the centers of their knockouts located at substantially the same distances from the outer end and from one another as those in the second wall.

7. An outlet box as in claim 6, wherein the odd-numbered side walls have knockouts all at like spacings from the enclosure's outer end, and the even-numbered side walls have knockouts all at like spacings from such outer end, but displaced longitudinally to lie at different spacings from the enclosure's outer end than the corresponding knockouts in the odd-numbered walls.

8. An outlet box as in claim 7, wherein the longitudinal displacement of the knockouts in the even-numbered walls, with relation to the corresponding knockouts in the odd-numbered walls is generally half the spacing between centers of adjacent knockouts in the odd-numbered walls.

9. An outlet box as in claim 6, wherein the knockouts in the even-numbered side walls are all of one size and those in the odd-numbered side walls are all of a different size, the knockouts in the first and the second side walls are at generally the same center-spacings, and those in the third and fourth side walls, are at generally the same center-spacings, but at spacings different from the spacings of the corresponding knockouts in the first and second walls, respectively, and so on around the enclosure.

10. An outlet box as in claim 6, the first and second side walls each having a second series of knockouts, of a size different from those of the first series, and interspersed with those of the first series in a definite geometrical pattern, the other side walls which correspond, respectively, to the first and to the second side walls also having a second such series of knockouts.

11. An outlet box as in claim 10, wherein the differently sized knockouts in each individual side wall are laterally offset from and generally tangent to one another.

12. An outlet box as in claim 6, the first and second side walls each having a second series of knockouts, of a size different from those of the first series, and arranged generally in longitudinal alignment therewith, with the centers of the knockouts of one series located midway between the centers of the knockouts of the other series.

13. An outlet box as in claim 6, the first and second side walls each having a second series of knockouts, of a size different from those of the first series, and arranged generally in longitudinal alignment therewith, with the circumferential margins of the smaller knockouts interiorly tangent to the margins of the correspondingly located larger knockouts.

14. An outlet box as in claim 6, wherein all the knockouts in the first, second, fifth, and sixth side walls are of the same size, and all knockouts in the third, fourth, seventh, and eighth side walls are of the same size, but of different size than those in the first-mentioned side walls.

15. An outlet box as in claim 1, wherein the several side walls each has a second series of knockouts of different size than the first series, arranged in a geometrical pattern similar to the pattern of the knockouts of the first series, but always non-concentric with such knockouts of the first series, and, like the first series, the centers of the knockouts in the second side wall being spaced at different distances from the open end of the box than are the knockouts of this same size which are located in the first side wall.

16. An outlet box of octagonal configuration, a plurality of knockouts of a given size in each side wall, with their centers at predetermined spacings longitudinally of the box and arranged in like geometrical patterns in each such side wall, but with the centers of the first, second, and any further knockouts in one such side wall, and the pattern in that side wall as a whole, displaced longitudinally by half the longitudinal spacing between the centers of the first, second, and any further knockouts, with relation to the centers and pattern in an adjoining side wall.

References Cited in the file of this patent

UNITED STATES PATENTS

| Number | Name | Date |
|---|---|---|
| 928,251 | Dorff | July 20, 1909 |
| 1,861,435 | Chamberlain et al. | June 7, 1932 |
| 1,934,300 | Fullman | Nov. 7, 1933 |
| 2,143,278 | Myers | Jan. 10, 1939 |
| 2,240,187 | Kingdon et al. | Apr. 29, 1941 |
| 2,625,288 | Clark et al. | Jan. 13, 1953 |